(12) United States Patent
Torr et al.

(10) Patent No.: US 6,713,180 B1
(45) Date of Patent: Mar. 30, 2004

(54) IMPROVEMENTS IN OR RELATING TO TEMPERED GLAZINGS AND GLASS FOR USE THEREIN

(75) Inventors: Ashley Carl Torr, Aughton (GB); Louise Sara Butcher, Lymm (GB); Kevin Jones, Wigan (GB); Alan Charles Woodward, Wigan (GB)

(73) Assignee: Pilkington plc, Merseyside (GB)

( * ) Notice: Subject to any disclaimer, the term of this patent is extended or adjusted under 35 U.S.C. 154(b) by 0 days.

(21) Appl. No.: 10/070,147

(22) PCT Filed: Sep. 1, 2000

(86) PCT No.: PCT/GB00/03342
§ 371 (c)(1),
(2), (4) Date: Mar. 1, 2002

(87) PCT Pub. No.: WO01/16040
PCT Pub. Date: Mar. 8, 2001

(30) Foreign Application Priority Data

Sep. 1, 1999 (GB) .............................................. 9920529
May 17, 2000 (GB) .............................................. 0011831

(51) Int. Cl.⁷ ........................ B32B 17/00; C03C 3/076; C03C 3/04; C03C 3/085; C03C 3/078
(52) U.S. Cl. ........................ 428/410; 428/409; 501/53; 501/55; 501/68; 501/69; 501/72
(58) Field of Search ................................ 428/410, 409; 501/53, 55, 68, 69, 72

(56) References Cited

U.S. PATENT DOCUMENTS 5,308,805 A * 5/1994 Baker et al. ................... 501/71
5,763,343 A * 6/1998 Brix et al. ..................... 501/67
5,932,502 A * 8/1999 Longobardo et al. ......... 501/70
5,952,255 A * 9/1999 Seto et al. ..................... 501/71
6,335,300 B1 * 1/2002 Bordeaux et al. ............. 501/72

FOREIGN PATENT DOCUMENTS

| EP | 0555552 A1 | 8/1993 |
| EP | 0887321 A2 | 12/1995 |
| EP | 0887321 A3 | 12/1998 |
| FR | 2595091 A1 | 9/1987 |
| FR | 2731696 A | 9/1996 |
| FR | 2775476 A1 | 9/1999 |
| GB | 1512163 | 5/1978 |
| GB | 2000117 B | 1/1979 |
| WO | WO 96/28394 | 9/1996 |
| WO | WO 99/44952 | 9/1999 |

* cited by examiner

Primary Examiner—Deborah Jones
Assistant Examiner—G. A. Blackwell-Rudasill
(74) Attorney, Agent, or Firm—Marshall & Melhorn, LLC

(57) ABSTRACT

Glazing, thermally tempered to required standards, are produced more readily by tempering panes having a high coefficient of thermal expansion (greater than $93 \times 10^{-7}$ per degree Centigrade) and for a low Fracture Toughness (less than $0.72$ $MPam^{1/2}$). Use of glasses selected according to the invention enables thin glazings (especially glazings less than 3 mm thick) to be tempered to automotive standard with improved yields using conventional tempering methods, and thicker glazings to be tempered at lower quench pressure than required hitherto. Suitable glasses include glasses comprising, in percentages by weight, 64 to 75% $SiO_2$, 0 to 5% $Al_2O_3$, 0 to 5% $B_2O_3$, 9 to 16% alkaline earth metal oxide other than MgO, 0 to 2% MgO, 15 to 18% alkali mental oxide and at least 0.05% total iron (calculated as $Fe_2O_3$)

15 Claims, No Drawings

IMPROVEMENTS IN OR RELATING TO TEMPERED GLAZINGS AND GLASS FOR USE THEREIN

BACKGROUND OF THE INVENTION

The invention relates to glazings of tempered glass, especially, but not exclusively,

1. Field of the Invention

Glazings of thin tempered glass (normally tempered float glass) for automotive use, a method of tempering a glazing, and to a novel glass composition suitable for use in the tempered glazings of the invention and in the method of the invention.

2. Discussion of Related Art

Prior to the 1970's, automotive glazings were generally 4 mm or 5 mm thick or even thicker. The first oil crisis of the 1970's encouraged a move towards thinner glazings for automotive use, especially in Europe and Japan, and towards solving the problems encountered in producing thin tempered glazings having the fracture characteristics required to meet official standards. In order to meet European standards, it was found necessary (because of the fracture characteristics of the glass) to provide a higher tempering stress together with an appropriate stress distribution (see, for example, UK patents GB 1 512 163 and GB 2 000 117) in order to achieve the required fracture patterns on breakage. Moreover, because of the reduced thickness of the glass, it was more difficult to achieve the temperature differential between the surface and core of the glass required to produce a given tempering stress. While satisfactory tempering was achieved in thicknesses of about 3 mm, the difficulties of tempering thinner glasses by conventional processes have inhibited progress in reducing glass thickness further so that, about 25 years after the introduction of such thin tempered automotive glazings, the commercial production of tempered automotive glazings having a thickness of less than 3.1 mm remains difficult.

We have now found that glazings, especially but not exclusively thinner glazings, can be more readily tempered including tempered to meet glazing standards (e.g. such as European automotive glazing standards) if the glass composition is appropriately modified, especially if the glass composition is modified to significantly increase its coefficient of thermal expansion and/or reduce its Fracture Toughness.

Certain selected glass compositions have previously been proposed for use in thin automotive glazing. International Patent Application WO 96/28394 relates to glass sheets of thickness in the range 2 to 3 mm having a total iron content (measured as $Fe_2O_3$) of 0.85 to 2% by weight, and specified optical properties, including a visible light transmission of greater than 70% and a total energy transmission of less than 50%. The glasses specifically described have a high alkali metal oxide content (ranging from 14.4% to 15.8% by weight) a magnesium oxide content ranging from 0.25% to 3.8% by weight and a calcium oxide content ranging from 8.4% to 8.6% by weight. The specification refers to the possibility of tempering single sheets of such thin glass for use in automotive side glazings, but make no reference to the difficulty of achieving commercially satisfactory tempering in practice.

International Patent Application WO 99/44952 relates to a sheet of soda lime silica glass designed to be heat tempered and characterised by a very high coefficient $\alpha$ of thermal expansion greater that $100 \times 10^{-7}$ $K^{-1}$ (although it does not specify the range of temperatures over which $\alpha$ is to be measured), a Young's Modulus E higher than 60 Gpa and a thermal conductivity K less than 0.9 $Wm^{-1}K^{-1}$. The invention is said to make possible glass sheets of thickness lower than 2.5 mm which can be tempered to the requirements of ECE Regulation R43 using apparatus previously envisaged for the tempering of 3.15 mm glass. The particular glasses described all have a very high alkali metal oxide content (in the range 19.9 to 22.3% by weight) resulting in low durability and making the glasses expensive to produce.

SUMMARY OF THE INVENTION

According to the present invention there is provided a thermally tempered glazing of soda lime silica glass produced by tempering a pane of glass having a coefficient of thermal expansion, $\alpha$, greater than $93 \times 10^{-7}$ °$C.^{-1}$ and/or a Fracture Toughness, FT, of less than 0.72 $MPam^{1/2}$. The invention is especially, but not exclusively, applicable to tempered glass panes less than 3 mm thick and to the tempering of such panes.

DESCRIPTION OF THE PREFERRED EMBODIMENTS

For the purpose of the present specification and claims, $\alpha$ is the value of the coefficient of thermal expansion per degree Centigrade of the glass measured over the range 100° C. to 300° C.; it is measured in accordance with ASTM E228 at constant heating rate. Preferably the coefficient of thermal expansion is at least $95 \times 10^{-7}$ per degree Centigrade, although modification of the composition to achieve a coefficient of thermal expansion greater than or equal to $100 \times 10^{-7}$, while beneficial to assist tempering, will generally be avoided on cost and durability grounds.

Toughness is the energy per unit area (Joules per square metre) required to make a crack grow. Fracture Toughness, FT, is related to Young's modulus and surface energy by $$FT = (2 \times \text{Surface Energy} \times \text{Young's Modulus}/1-v^2)^{1/2}$$

where v is Poisson's ratio. For the purpose of the present specification and claims, it is determined by indenting a bar of glass using a Vickers indenter at a load sufficient to produce cracks at the corners of the indentation, and then breaking the bar in a 3- or 4-point bend test and the determining fracture stress, $\sigma_f$, in Pascals required for breakage. The Fracture Toughness of the glass, assuming it is in the fully annealed state*, is then given by $$FT = \eta (E/H)^{1/8} \sigma_f^{3/4} P^{1/4}$$

where $\eta$ is a constant, E is Young's modulus, H is the hardness of the glass, and P is the load used to create the indentation.

*Flat glass will be the fully annealed state if it has been heated at the annealing temperature for one hour and cooled at 2° C. per minute to room temperature.

The constant $\eta$ is determined with reference to FIG. 8.20 in Fracture of Brittle Solids (Brian Lawn, Cambridge University Press 1993). Applying values of E=70 GPa, H=5.5 GPa and FT=0.75 $MPam^{1/2}$ for soda lime silica glass the value of $\eta$ is $\eta$=0.44.

If the glass is not in the fully annealed state*, it is necessary to apply a correction for residual stress to the Fracture Toughness calculated using the above equation. In practice, it is convenient to measure the Fracture Toughness of glass in the fully annealed state.

Preferably, the glass has a Fracture Toughness of less than or equal to 0.70 MPam$^{1/2}$, especially less than or equal to 0.68 MPam$^{1/2}$.

In a preferred embodiment of the invention, the glass has a coefficient of thermal expansion α (° C.$^{-1}$ in the range 100° to 300° C.) and a Fracture Toughness, FT (in MPam$^{1/2}$) such that $$\frac{\alpha \times 10^7}{FT} \geq 135$$

preferably $\geq 140$, and especially $\geq 145$.

It has been found that an increase in the alkali metal oxide content of the glass tends to increase the coefficient of thermal expansion, and while it is well known that glass can be produced with high alkali metal contents (patents relating to glass compositions for production by the float process typically propose an alkali metal oxide content in a range up to about 20%), an increase in alkali metal oxide content generally increases the cost of the glass and reduces its durability. In consequence, commercially available float glass generally has an alkali metal oxide content in the range of 13 to 14% by weight, and glasses with higher alkali metal oxide contents are not used in the production of thermally tempered glazings, especially automotive glazings. We have found that increasing the alkali metal oxide content by a relatively small amount results in a surprising increase in the ease of tempering (as measured, for example, by the particle count on fracture) of the glass (especially when associated with a modification of the alkaline earth metal oxide content of the base glass as explained below). Thus certain preferred glasses have an alkali metal content greater than 15% by weight, preferably less than 19% (to avoid excessive cost and loss of durability) and especially in the range 15% to 18% by weight, especially preferred glasses have an alkali metal content of 15% to 17% by weight. The sodium oxide content is preferably greater than 14.5% by weight.

Further improvements in ease of tempering appear to result from increasing the ferrous oxide content of the glass, and we especially prefer to use glass compositions containing at least 0.2%, especially at least 0.3%, by weight of ferrous oxide (calculated as ferric oxide), and, in one embodiment of the invention, that at least 30% (preferably at least 35%) of any iron oxide present to be in the form of ferrous oxide (where, in calculating the percentages, both ferric oxide and ferrous oxide are calculated as if ferric oxide).

The alkali metal oxide is believed to operate both by increasing the coefficient of thermal expansion of the glass (so increasing the stress differential between the surface layers of the glass and the core resulting from a given temperature difference between surface and core) and reducing the thermal conductivity of the glass (so increasing the temperature differential between surface and core when the surface is rapidly cooled in a thermal tempering process). However, the results achieved, especially with glasses containing significant amounts of ferrous iron, show a much greater increase in ease of tempering to meet European automotive glazing standards than can be accounted for by these effects alone, and these can be attributed, at least in part, to a reduction in Fracture Toughness of the glass.

One effect of increasing the alkali metal oxide content in a soda-lime-silica glass is believed to be an increase in the proportion of non-bridging oxygens (a bridging oxygen being an oxygen bonded directly to two silicon atoms. Si—O—Si) present:

The formation of such non-bridging oxygens in a silica lattice leads to a weakening of the glass structure, which is associated with reduced Fracture Toughness, and we have found that the reduced Fracture Toughness is associated with increased ease of tempering. The effect of incorporating alkaline earth metal ions in a silica lattice is similarly to displace oxygens directly bridging between silica atoms:

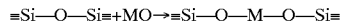

where M is an alkaline earth metal. Differences in bonding strengths occur through different sizes of alkaline earth metal ions. In general, we believe the smaller the alkaline earth metal incorporated, the stronger the lattice and the higher the Fracture Toughness of the glass, with the difference between calcium ions and magnesium ions being particularly marked. Thus, to decrease the Fracture Toughness of the glass, it is desirable to maintain the magnesium content of the glass low (less than 2%, preferably less than 1%, especially less than 0.5%, all by weight), while avoiding use of an excessively high (from a cost viewpoint) proportion of alkali metal oxide will generally imply a content of alkaline earth metal oxide, other than magnesium oxide, of at least 9% and preferably at least 10%, by weight. Preferably, the glass will contain at least 9% and especially at least 10% of calcium oxide, and the total alkaline earth metal oxide content (including magnesium oxide) of the glass will normally be more than 10% by weight.

The glass will usually be float glass with a composition (in percentages by weight) of:

| | |
|---|---|
| SiO$_2$ | 64–75% |
| Al$_2$O$_3$ | 0–5% |
| B$_2$O$_3$ | 0–5% |
| Alkaline earth metal oxide | 6–15% |
| (alkaline earth metal oxide other than MgO preferably 9–15%) | |
| Alkali metal oxide | 15–20% |
| (preferably 15–17% with sodium oxide, preferably more than 14.5% especially more than 14.75%) | |
| Total iron (calculated as Fe$_2$O$_3$) | |
| preferably greater than 0.3%, especially 0.5–2.5% | |
| TiO$_2$ | 0–1% |

Certain of the glass compositions which may be used in the practice of the present invention are new, and according to a further aspect of the invention, there is provided a novel soda lime silica glass in sheet form of composition comprising in percentage by weight:

| | |
|---|---|
| SiO$_2$ | 64–75% |
| Al$_2$O$_3$ | 0–5% |
| B$_2$O$_3$ | 0–5% |
| Alkaline earth metal oxide (other than MgO) | 9–16%, preferably 10–16% |
| MgO | <2% |
| Alkali metal oxide | 15–18% |
| Total iron (calculated as Fe$_2$O$_3$) | $\geq 0.05\%$ | and any small proportions of additional components, for example, titania and other colouring agents, for example, selenium, cobalt oxide, nickel oxide, chromium oxide, cerium oxide.

Preferably the glass composition contains, in percentages by weight, 67–73% SiO$_2$, 0–3% Al$_2$O$_3$, 0–3% B$_2$O$_3$, alkaline earth metal oxide (other than MgO) 10–14%, alkali metal oxide 15–17%.

While magnesium oxide contents below 0.5% may be preferred for optimum results, in practice, achieving a very low magnesium content will generally imply a long changeover time when the glass is made successively with a conventional glass containing a higher proportion (typically around 4%) of magnesium oxide and, in practice therefore, we normally prefer to employ glasses containing at least 0.5% by weight of magnesium oxide. Moreover, for such practical reasons, a magnesium oxide content in the range 0.75% to 1.5% by weight will commonly be preferred.

The novel glasses of the present invention will normally contain iron, either to modify the optical properties and/or enhance the temperability of the glass, or at least as an impurity (since the use of iron free batch materials is likely to add significantly to the cost of the batch); in the latter case it will normally be present in an amount of at least 0.05% by weight (calculated as ferric oxide).

In the former case, iron will normally be present in an amount (calculated as ferric oxide) of at least 0.5% by weight. For a particularly high performance i.e. high visible light transmission with relatively low solar energy transmission, the percentage of iron in the ferrous state will be above 30%. In other cases, the percentage of iron in the ferrous state will be less than 30% (i.e. the ratio of ferrous iron (calculated as ferric oxide) to total iron (calculated as ferric oxide) in the glass will be less than 30%).

Preferred ranges of compositions are as discussed above in relation to the tempered glazing of the invention. These glasses are used in sheet form and will normally have a thickness in the range 1 to 6 mm, especially 2 to 5 mm, and be formed by the float process.

A particularly preferred glass according to the present invention has the following composition in percentages by weight:

| | |
|---|---|
| $SiO_2$ | 71.0 |
| CaO | 10.5 |
| $Fe_2O_3$ | 1.0 |
| $Al_2O_3$ | 1.11 |
| MgO | 0.21 |
| $Na_2O$ | 14.9 |
| $K_2O$ | 0.64 |
| $TiO_2$ | 0.35 |
| $SO_3$ | 0.17 |
| % Ferrous | 35 | which composition is hereinafter referred to as Composition I. Composition I has a coefficient of thermal expansion, $\alpha$, of $98.9 \times 10^{-7}$ °C.$^{-1}$ (in the range 100° C. to 300° C.), and a Fracture Toughness of $0.66 \pm 0.02$ MPam$^{1/2}$, so that, for Composition I:

$$\frac{\alpha \times 10^7}{FT} = \frac{98.9}{0.66} = 150$$

The use of the specially selected glass compositions in accordance with the present invention facilitates the production of thin (less than 3 mm) tempered glasses, and is especially valuable in permitting the commercial production of tempered automotive glazings in thicknesses of 2.3 to 3 mm, especially 2.6 to 2.9 mm, by conventional tempering methods. It is known that glazings below 3 mm can be tempered using specialist tempering processes, such as powder tempering, or special tempering boxes available in commerce from Glasstech Inc of Perrysburg, Ohio, USA; it is the ability to temper the glass by conventional methods with satisfactory yields without additional cost that is especially valuable. The glazings may be tempered to meet national and international (especially European Standard ECE R43) standards for automotive glazings, especially sidelights and backlights.

Even thinner glasses, for example glasses having a thickness in the range 1.0 mm to 2.5 mm, especially 1.6 mm to 1.9 mm, can be semi-tempered e.g. tempered to semi-dicing fracture, e.g a surface compressive stress of at least 35 MPa, in accordance with the invention for use in laminated automotive glazings (especially opening side glazings required to pass a door slam test).

While the main advantage of using the special glass compositions of the invention lies in tempering thin glasses by conventional methods, their use in thicker glasses is also valuable in enabling the required stresses to be achieved with lower heat transfer coefficients and hence lower blowing pressures, with a consequent reduction in the use of energy.

Thus, according to a further aspect of the present invention there is provided a method of tempering a glazing (especially an automotive glazing) composed of glass having a high (greater than $93 \times 10^{-7}$° C.$^{-1}$) coefficient of thermal expansion and/or a low Fracture Toughness (less than 0.72 MPam$^{1/2}$) by operating at quench pressure at least 10% less, normally more than 20% less and preferably at least 25% less, than the quench pressure required to temper a corresponding glazing of standard composition to the required standards. Under optimum circumstances, use of the present invention may permit achievement of required tempering standards at a quench pressure 40% or more less than the quench pressure required to toughen a corresponding glazing of standard composition to those standards. The required tempering standards vary from country to country but generally require achievement of dicing fracture. By "required standards" we mean the standards required by the authorities in the country in which the glazing is to be used. In Europe, this will generally be ECE R43 for automotive glazings.

The method of the present invention is especially applicable to glazings having a thickness in the range 3 mm to 5 mm glazings and will generally result in the use of blowing pressures of not more than 12.5 kPa (50 inches water gauge), preferably not more than 10 kPa (40 inches water gauge), especially not more than 7.5 kPa (30 inches water gauge) for 3 mm glass, to not more than 7.5 MPa (30 inches water gauge), preferably not more than 6 kPa (24 inches water gauge) for 4 mm glazing, and not more than 6 kPa (24 inches water gauge) preferably not more than 5 kPa (20 inches water gauge), for 5 mm glass. The values for blowing pressure quoted above are generally applicable with dwell times (the times between the leading edge of the glass exiting the heated zone and the trailing edge of the glass entering the quench) of around 5 or 6 seconds; it will be appreciated, however, that the lower the dwell time (for a given temperature at exit from the heating zone), the lower the blowing pressure required.

The method of the present invention offers a number of advantages. The use of lower quench pressure results in a saving of energy and reduces the risk of a visible orange peel effect on tempering. Moreover, since a lower quench pressure may be used, equipment (especially air blowers) and conditions may be used to temper glazings of the selected glass compositions of the invention which are thinner than the conventional glazings which can be satisfactorily tempered using that equipment and those conditions; thus, for example, equipment and conditions capable of tempering glazings of conventional composition having a of at least thickness 5 mm may be used to toughen glazings of glass having a modified composition as taught herein of lesser thickness e.g. 4 mm.

The expression "standard composition" is used herein to refer to a known iron containing glass used extensively for production of tempered 3.1 mm automotive glazings and having the following composition in percentages by weight:

| | |
|---|---|
| SiO$_2$ | 72.1% |
| CaO | 8.15% |
| Fe$_2$O$_3$ | 1.07% |
| Al$_2$O$_3$ | 0.52% |
| MgO | 3.96% |
| Na$_2$O | 13.7% |
| K$_2$O | 0.28% |
| TiO$_2$ | 0.04% |
| SO$_3$ | 0.14% |
| % Ferrous | 25 |

The glass has a coefficient of thermal expansion, $\alpha$, of $92.4 \times 10^{-7}$ (in the range 100° to 300° C.), and a Fracture Toughness of 0.71 MPam$^{1/2}$, so that, for this glass, $$\frac{\alpha \times 10^7}{FT} = \frac{92.4}{0.71} = 130$$

Samples of the glass, referred to as OPTIKOOL™ 371, are available from Group Intellectual Property Department, Pilkington plc, St Helens. England.

The invention is illustrated but not limited by the following examples which describe the thermal tempering of automotive side glazings and components therefor in accordance with the invention.

EXAMPLE 1

Blanks for a front door glass for a typical family size saloon car were cut to size from float glass of Composition I and thickness 2.85 mm and prepared for bending and tempering by edge grinding and washing in conventional manner.

The blanks were loaded in turn into a horizontal roller furnace and heated in the furnace to a temperature in the range 650° C. to 670° C. Each blank was removed from the furnace on rollers and advanced into a bending zone, where the rollers were lowered to deposit the glass blank on a peripheral female mould of appropriate curvature for the glazing required. The glass sagged on the mould under the influence of gravity to assume the required curvature. The mould carrying the curved glass was then advanced between quench boxes where the glass was quenched with cold air at a pressure in the range 8 kPa (32" water gauge) to 24 kPa (96" water gauge). The mould carrying the curved tempered glazing was removed from the quench, the glazing allowed to cool to room temperature and assessed for shape (fit to fixture), optical quality, surface compressive stress measured by differential stress refractometry (DSR) and behaviour on fracture at a central position. In each case, the shape and optical quality conformed both to relevant ECE Standards and normal OE customer requirements.

The key parameters of the bending and tempering processes, and the measured surface stress and fracture behaviour (expressed as the minimum and maximum number of particles observed in a 5 cm square on the surface of the glazing after fracture at a central position) are shown in the accompanying Table 1.

The procedure described above was repeated using glass of composition I of thickness 3.1 mm, and thereafter using OPTIKOOL™ 371 glass (standard composition as set out above) of thickness 3.1 mm. In all cases, the shape and optical quality conformed both to relevant ECE Standards and normal OE customer requirements. Again, the key parameters of the bending and tempering processes, and the measured surface stress and fracture behaviour, are shown in the accompanying Table 1.

TABLE 1

Saloon front door glazing (sag bent and tempered)

| Sample | Composition | Thickness mm | Glass exit[1] temperature ° C. | Draw[2] time, seconds | Quench entry temperature, ° C. | Quench pressure kPa (inches water gauge) upper/lower | Surface compressive stress MPa | Fracture pattern Min/Max |
|---|---|---|---|---|---|---|---|---|
| 1 | I | 2.89 | 665 | 3.7 | — | 8/7 (32/28) | 90 | 22/151 |
| 2 | I | 2.86 | 665 | 3.7 | — | 8/7 (32/28) | 97 | 15/144 |
| 3 | I | 2.85 | 664 | 5.7 | 597 | 8/7 (32/28) | 83 | 1/23 |
| 4 | I | 2.85 | 664 | 5.7 | 598 | 8/7 (32/28) | 82 | 3/25 |
| 5 | I | 2.86 | 663 | 7.6 | 582 | 8/7 (32/28) | 63 | — |
| 6 | I | 2.84 | 663 | 7.6 | 584 | 8/7 (32/28) | 65 | 1/6 |
| 7 | I | 2.89 | 665 | 3.7 | 610 | 17/16 (67/64) | 101 | 137/379 |
| 8 | I | 2.89 | 664 | 3.7 | 610 | 17/16 (67/64) | 90 | 143/370 |
| 9 | I | 2.89 | 667 | 5.7 | 600 | 17/16 (67/64) | 100 | 58/237 |
| 10 | I | 2.89 | 664 | 5.7 | 598 | 17/16 (67/64) | 81 | 55/173 |
| 11 | I | 2.89 | 667 | 7.6 | 589 | 17/16 (67/64) | 69 | 6/91 |
| 12 | I | 2.89 | 667 | 7.6 | 587 | 17/16 (67/64) | 71 | 8/70 |
| 13 | I | 2.89 | 666 | 3.7 | 613 | 22/21 (86/84) | 93 | 165/407 |
| 14 | I | 2.90 | 664 | 3.7 | 610 | 22/21 (86/84) | 99 | 161/387 |
| 15 | I | 3.15 | 661 | 3.7 | 610 | 8/7 (32/28) | 91 | 63/198 |
| 16 | I | 3.16 | 662 | 3.7 | — | 8/7 (32/28) | 97 | 67/254 |
| 17 | I | 3.15 | 660 | 5.7 | — | 8/7 (32/28) | 75 | 31/136 |
| 18 | I | 3.15 | 661 | 5.7 | 598 | 8/7 (32/28) | 83 | 37/131 |
| 19 | I | 3.15 | 660 | 7.6 | 583 | 8/7 (32/28) | 73 | 4/6 |
| 20 | I | 3.15 | 659 | 7.6 | 583 | 8/7 (32/28) | 70 | 1/51 |
| 21 | I | 3.15 | 665 | 3.6 | 613 | 17/16 (67/64) | 108 | 218/405 |
| 22 | I | 3.15 | 664 | 3.6 | 610 | 17/16 (67/64) | 107 | 219/456 |
| 23 | I | 3.14 | 668 | 5.7 | 599 | 17/16 (67/64) | 101 | 126/404 |
| 24 | I | 3.14 | 664 | 5.7 | 601 | 17/16 (67/64) | 96 | 123/341 |

TABLE 1-continued

Saloon front door glazing (sag bent and tempered)

| Sample | Composition | Thickness mm | Glass exit[1] temperature ° C. | Draw[2] time, seconds | Quench entry temperature, ° C. | Quench pressure kPa (inches water gauge) upper/lower | Surface compressive stress MPa | Fracture pattern Min/Max |
|---|---|---|---|---|---|---|---|---|
| 25 | I | 3.14 | 665 | 7.6 | 587 | 17/16 (67/64) | 69 | 49/251 |
| 26 | I | 3.14 | 667 | 7.6 | 589 | 17/16 (67/64) | 72 | 47/265 |
| 27 | I | 3.16 | 661 | 3.7 | — | 22/21 (86/84) | 101 | 217/498 |
| 28 | I | 3.16 | 661 | 3.7 | — | 22/21 (86/84) | 103 | 265/482 |
| 29 | OPTIKOOL ™ 371 | 3.14 | 662 | 3.7 | 610 | 8/7 (32/28) | 77 | 17/125 |
| 30 | OPTIKOOL ™ 371 | 3.13 | 662 | 3.7 | 609 | 8/7 (32/28) | 76 | 28/110 |
| 31 | OPTIKOOL ™ 371 | 3.15 | 661 | 5.7 | — | 8/7 (32/28) | 70 | 11/45 |
| 32 | OPTIKOOL ™ 371 | 3.15 | 665 | 5.7 | — | 8/7 (32/28) | 88 | 8/52 |
| 33 | OPTIKOOL ™ 371 | 3.14 | 658 | 7.6 | 580 | 8/7 (32/28) | 6 | 1/6 |
| 34 | OPTIKOOL ™ 371 | 3.14 | 658 | 7.6 | 581 | 8/7 (32/28) | — | — |
| 35 | OPTIKOOL ™ 371 | 3.13 | 669 | 3.8 | 613 | 17/16 (67/64) | 102 | 93/243 |
| 36 | OPTIKOOL ™ 371 | 3.13 | 668 | 5.7 | 600 | 17/16 (67/64) | 91 | 46/108 |
| 37 | OPTIKOOL ™ 371 | 3.13 | 666 | 7.6 | 587 | 17/16 (67/64) | 76 | 13/101 |
| 38 | OPTIKOOL ™ 371 | 3.15 | 663 | 3.7 | 612 | 22/21 (86/84) | 97 | 153/317 |
| 39 | OPTIKOOL ™ 371 | 3.15 | 661 | 3.7 | — | 22/21 (86/84) | 97 | 131/376 |

[1]on exit from the furnace
[2]time between leading edge of the glass exiting the heated zone and trailing edge of the glass entering the quench.

When the results (surface compressive stress and fracture pattern) obtained with samples 15 to 28 are compared with the results obtained with samples 29 to 39, the enhanced temperability of the 'high' alkali metal oxide glasses used in accordance with the invention is apparent. Thus, with the same draw time (3.7 seconds) and quench pressure (8/7 kpa) samples 15 and 16 of glass Composition I exhibited surface compressive stress of 91 MPa and 97 MPa respectively and fracture patterns with 63/198 and 67/254 particles (in accordance with ECE R43), while samples 29 and 30 of OPTIKOOL™ 371 glass exhibited surface compressive stresses of 77 MPa and 76 MPa respectively, with fracture patterns exhibiting 17/125 and 28/110 (failing to meet ECE R43, the reduced number of particles corresponding to the reduced compressive stress). In fact, the only samples of OPTIKOOL™ 371 tempered which meet ECE R43 (a particle count between a minimum of 40 and a maximum of 450 for glass less than 4 mm thick) are 35, 36, 38 and 39, all of which employ a minimum quench entry temperature of 600° C. and/or a quench pressure of 17/16 kPa or higher. In contrast, the use of the higher alkali metal oxide glass composition in accordance with the invention enables the standards to be achieved using lower pressures (samples 15 and 16), or the same pressure with a lower quench entry temperature (samples 23 to 26), making possible a significant saving in energy consumption.

EXAMPLE 2

Blanks for a front door glazing for a typical family size saloon were cut to size from glass of composition I and 2.6 mm thickness and prepared for tempering by edge grinding and washing in conventional manner.

The blanks were loaded into a horizontal roller furnace where they were heated to 580° C. and advanced onto a gas hearth furnace, in which the glasses were supported on a cushion of air from a bed shaped to the required curvature. The glasses were heated to a temperature in the range 620° C. to 670° C. as they are advanced along the gas hearth and sagged to the required shape; after bending they were advanced into a horizontal quench section where they were quenched between quench nozzles above and below, while being supported by the quench air from below. The glasses were then removed from the quench, cooled to room temperature, and assessed for shape (fit to fixture), optical quality, surface compressive stress measured by DSR and behaviour on fracture at a central position.

The key parameters of the process, and the measured surface stress and fracture behaviour (expressed as minimum and maximum number of particles observed in a 5 cm square on the surface of the glazing after fracture at a central position) are shown in the accompanying Table 2. For each sample, the shape and optical quality conformed both to relevant ECE standards and normal customer requirements.

The results show that satisfactory tempering stresses were achieved using modest quench pressures. While in each case, the requirements of ECE R43 for minimum and maximum number of particles were met, samples 2 and 3 exhibited a number of splines (elongated glass particles longer than 5 cm) where pressure would have led to failure to meet that standard. However, these could be avoided by inclusion of an additional "striping" nozzle in the quench in known manner (see, for example, UK patent specification GB 2,000,117).

EXAMPLE 3

Blanks for a laminated front door glazing for a typical family size saloon were cut from glass of composition I of 1.8 mm thickness, and from OPTIKOOL™ 371 glass of 1.8 mm thickness and prepared for tempering by edge grinding and washing in conventional manner.

TABLE 2

Saloon front door glazing
(bent and tempered on a gas hearth)

| Sample | Gas hearth furnace exit/quench entry temperature ° C. | Quench pressure kPa (inches water gauge) upper/lower | Surface compressive stress MPa | Fracture pattern Min | Fracture pattern Max |
|---|---|---|---|---|---|
| 1 | 665 | 20/11 (80/45) | 87.3 | 44 | 224 |
| 2 | 650 | 20/11 (80/45) | 85.8 | 70 | 238 |
| 3 | 640 | 21/20 (84/80) | 95.7 | 59 | 304 |

TABLE 3

Semi-tempered component of laminated front glazing for saloon (bent and tempered on gas hearth)

| Sample | Composition | Gas hearth furnace exit/quench entry temperature ° C. | Quench pressure kPa (inches water gauge) upper/lower | Surface compressive stress, MPa |
|---|---|---|---|---|
| 1 | I | 633 | (11/8) 45/30 | 73.7 |
| 2 | I | 655 | (6/5) 24/20 | 90.8 |
| 3 | OPTIKOOL ™ 371 | 624 | (11/8) 45/30 | 61.1 |
| 4 | OPTIKOOL ™ 371 | 645 | (6/5) 24/20 | 57.4 |

The glass blanks were then bent and tempered on a gas hearth furnace and assessed as described in Example 2, except that, since they were to be used as the components of a laminated glazing, no fracture tests were carried out.

The key parameters of the process and results of the stress measurements are shown in the accompanying Table 3. Comparison between the samples 1 and 2 of high alkali glass and samples 3 and 4, of standard glass shows the increased stress achieved with the higher alkali glass in accordance with the invention. While some of this increase may be due to the higher temperature of samples 1 and 2 at quench entry (for the same quench pressures), this factor does not adequately explain the differences which are attributable to the different composition of the glasses.

EXAMPLES 4 to 6

The following Examples describe production of samples of tempered glass and illustrate the improved ease of tempering resulting from appropriate choice of glass composition to increase its coefficient of thermal expansion while reducing its Fracture Toughness.

Samples of each of the glasses shown in accompanying Table 4 were melted in the laboratory and cast into plates which were fully annealed. The coefficient of thermal expansion of each of the glasses was measured, together with its Fracture Toughness and, for the Comparative Example and Example 4, the centre tension. For Fracture Toughness, 20 bars of each glass were cut and polished to a normal size of 65×10×3.15 mm, measured as described above and the results averaged. To assess the ease of tempering of the sample glasses, a minimum 4 samples of each glass 100× 100×4 mm, all polished and edge worked, were tempered by heating at 700° C. for 200 seconds on an oscillating horizontal furnace and then quenched horizontally using the quench pressures shown in Table 4; the quench time was 155 seconds including cooling. The samples were then fractured at the edge, and the number of particles formed in a square of 5 cm side in the centre of the sample were counted and the results reported in the Table.

The glass used for the Comparative Example had approximately the same composition as OPTIKOOL™, modified by the omission of iron and the adjustment of other components present to compensate. Example 4 differed from the Comparative Example solely in the reduction of the MgO content from 3.9 weight per cent to 0.1 weight per cent and its replacement with calcium oxide. This adjustment has led to an increase in the coefficient of thermal expansion, from $91.4 \times 10^{-7}$ per degree Centigrade to $93.9 \times 10^{-7}$ per degree Centigrade, and a reduction in Fracture Toughness from 0.70 $MPam^{1/2}$ to 0.67 $MPam^{1/2}$. On tempering under identical conditions, the glass of Example 4 exhibited a higher centre tension (69.0 MPa) than the glass of the Comparative example (67.2 MPa), and a significantly higher particle count on fracture (average 422, as compared to an average of 374 obtained with the Comparative Example). It can thus be seen that the reduction in content of magnesium oxide and its replacement with calcium oxide has led to a significant improvement in the ease with which the glass may be tempered to a required standard. The ability to control the ease with which the glass may be tempered (temperability) may be exploited in a number of ways, for example, to enable thinner glass panes than hitherto to be satisfactorily tempered under given tempering conditions, or by reducing the severity of the conditions (with consequent economies in running costs and, in appropriate circumstances, capital costs of the tempering operation) used for tempering.

Examples 5 and 6 similarly show the beneficial effect on tempering, as determined form the fractured patterns of the fractured glasses, resulting from replacing magnesium oxide (in Example 6) by calcium oxide (in Example 5), but in this case in a glass containing about 1% by weight of iron oxide and a higher alkali metal oxide content (above 15% by weight).

In these Examples, the tempering operation was carried out under less stringent conditions than used in the Comparative Example and in Example 4, so that, despite the higher alkali metal oxide content and more favourable ratios of $\alpha \times 107$ : Fracture Toughness, lower tempering stresses (and corresponding lower particle count on fracture) were achieved on tempering to provide a fracture pattern in accordance with European standards.

The difference in particle count on fracture between Examples 5 and 6 is attributed to the reduced magnesium oxide content and increased calcium oxide content of Example 5 compared to Example 6, which more than compensated for the marginally higher alkali metal oxide content in Example 6, resulting in increased ease of tempering.

TABLE 4

| | Comparative Example | Example 4 | Example 5 | Example 6 |
|---|---|---|---|---|
| Oxide (weight %) | | | | |
| $SiO_2$ | 73.27 | 73.27 | 71.8 | 70.9 |
| $Na_2O$ | 13.70 | 13.70 | 14.9 | 15.3 |
| $K_2O$ | 0.33 | 0.33 | 0.3 | 0.3 |
| MgO | 3.91 | 0.10 | 1.1 | 3.9 |
| CaO | 7.92 | 11.73 | 10.1 | 7.8 |
| $Al_2O_3$ | 0.64 | 0.64 | 0.6 | 0.6 |
| $TiO_2$ | 0.05 | 0.05 | 0.04 | 0.04 |
| $ZrO_2$ | 0.04 | 0.04 | | |
| $Fe_2O_3$ | | | 0.92 | 0.92 |
| $SO_3$ | 0.30 | 0.30 | 0.25 | 0.25 |
| % Fe in ferrous state | | | 25% | 25% |
| $\alpha$ (100–300° C.) × $10^7$/ ° C. | 91.4 | 93.9 | 97.7 | 98.2 |
| Fracture Toughness $MPam^{1/2}$ with indentation load of | | | | |
| 2.94 N | 0.71 | 0.64 | 0.61 | 0.75 |
| 4.91 N | 0.66 | 0.63 | 0.67 | 0.68 |

TABLE 4-continued

|  | Comparative Example | Example 4 | Example 5 | Example 6 |
|---|---|---|---|---|
| 9.81 N | 0.68 | 0.69 | 0.63 | 0.68 |
| 19.62 N | 0.74 | 0.72 | 0.67 | 0.72 |
| Average | 0.70 | 0.67 | 0.65 | 0.71 |
| $\frac{\alpha \times 10^7}{FT}$ | 131 | 140 | 150 | 138 |
| Centre tension (MPa) | 67.2 ± 1.5 | 69.0 ± 1.7 | | |
| Quench pressure kpa (psi) | | | | |
| Upper | 138 (20) | 138 (20) | 28 (4) | 28 (4) |
| Lower | 69 (10) | 69 (10) | 14 (2) | 14 (2) |
| Particle count on fracture | | | | |
| Example 1 | 344 | 415 | 133 | 66 |
| Example 2 | 375 | 476 | 123 | 81 |
| Example 3 | 384 | 350 | 108 | 80 |
| Example 4 | 393 | 448 | 89 | 96 |
| Example 5 | | | 114 | 68 |
| Average | 374 | 422 | 113 | 78 |

According to a modified aspect of the invention, a thermally tempered glazing of soda lime silica glass having a thickness of less than 3 mm is of green glass containing at least 14.5% by weight Na$_2$O, at least 10.5% by weight CaO, at least 0.5% by weight total iron (measured as Fe$_2$O$_3$) and being substantially magnesium-free. While, especially in this modified aspect of the invention, the magnesium content of the glass is very low, at least some magnesium is likely to be present as an impurity or a trace element in the batch or as a carry over from a previous run on the furnace; however, the maximum amount of magnesium present in the composition is unlikely to exceed about 0.2% by weight.

What is claimed is:

1. A thermally tempered glazing of soda lime silica glass produced by tempering a pane of glass having an alkali metal oxide content in the range 15 to 18% by weight, a coefficient of thermal expansion greater than 93×10$^{-7}$ per degree Centigrade and a Fracture Toughness of less than 0.72 MPam$^{1/2}$.

2. A thermally tempered glazing as claimed in claim 1 having a thickness of less than 3 mm.

3. A thermally tempered glazing as claimed in claim 1 wherein the glass has a coefficient of thermal expansion of at least 95×10$^{-7}$ per degree Centigrade.

4. Thermally tempered glazing as claimed in claim 1 wherein the glass has a Fracture Toughness of less than 0.70 MPam$^{1/2}$.

5. A thermally tempered glazing as claimed in claim 1 wherein the coefficient of thermal expansion a per degree Centigrade and Fracture Toughness FT (in MPam$^{1/2}$) of the glass are such that $$\frac{\alpha \times 10^7}{FT} \geq 135.$$

6. A thermally tempered glazing as claimed in claim 1 wherein the glass has a ferrous oxide content (calculated as ferric oxide) of at least 0.2% by weight.

7. A thermally tempered glazing as claimed in claim 6 wherein the glass has a ferrous oxide content (calculated as ferric oxide) of at least 0.3% by weight.

8. A thermally tempered glazing as claimed in claim 1 wherein the glass has a magnesium oxide content of less than 2% by weight.

9. A thermally tempered glazing as claimed in claim 1 wherein the glass has a content of alkaline earth metal oxide (other than magnesium oxide) of at least 9% by weight.

10. A thermally tempered glazing as claimed in claim 1 having a thickness in the range 2.3 to 2.9 mm.

11. A laminated automotive glazing comprising at least one semi-tempered glass pane having a thickness in the range 1.5 mm to 2.5 mm, produced by semi-tempering a pane of glass as claimed in claim 1.

12. A thermally tempered glazing of soda lime silica glass having a thickness of less than 3 mm, the glass being green glass containing at least 14.5% by weight Na$_2$O, at least 10.5% by weight CaO, at least 0.5% by weight total iron (measured as Fe$_2$O$_3$) and being substantially magnesium-free, the glass having a ferrous value (% ferrous) of at least 30%.

13. A glazing as claimed in claim 12, wherein the glazing is a thermally tempered glazing of soda lime silica glass produced by tempering a pane of glass having a coefficient of thermal expansion greater than 93×10$^{-7}$ per degree Centigrade and a Fracture Toughness of less than 0.72 MPam$^{1/2}$.

14. A laminated automotive comprising at least one semi tempered glass pane having a thickness in the range 1.5 mm to 2.5 mm, and being of green glass having a composition comprising at least 14.5% by weight Na$_2$O, at least 10.5% by weight CaO, at least 0.5% by weight total iron (measured as Fe$_2$O$_3$) and being substantially magnesium-free, the glass having a ferrous value (% ferrous) of at least 30%.

15. A laminated glazing as claimed in claim 14, wherein the glazing is a laminated automotive glazing comprising at least one semi-tempered glass pane having a thickness in the range 1.5 mm to 2.5 mm, produced by semi-tempering a pane of glass having a coefficient of thermal expansion greater than 93×10$^{-7}$ per degree Centigrade and a Fracture Toughness of less than 0.72 MPam$^{1/2}$.

* * * * *